United States Patent Office 3,378,115
Patented Apr. 16, 1968

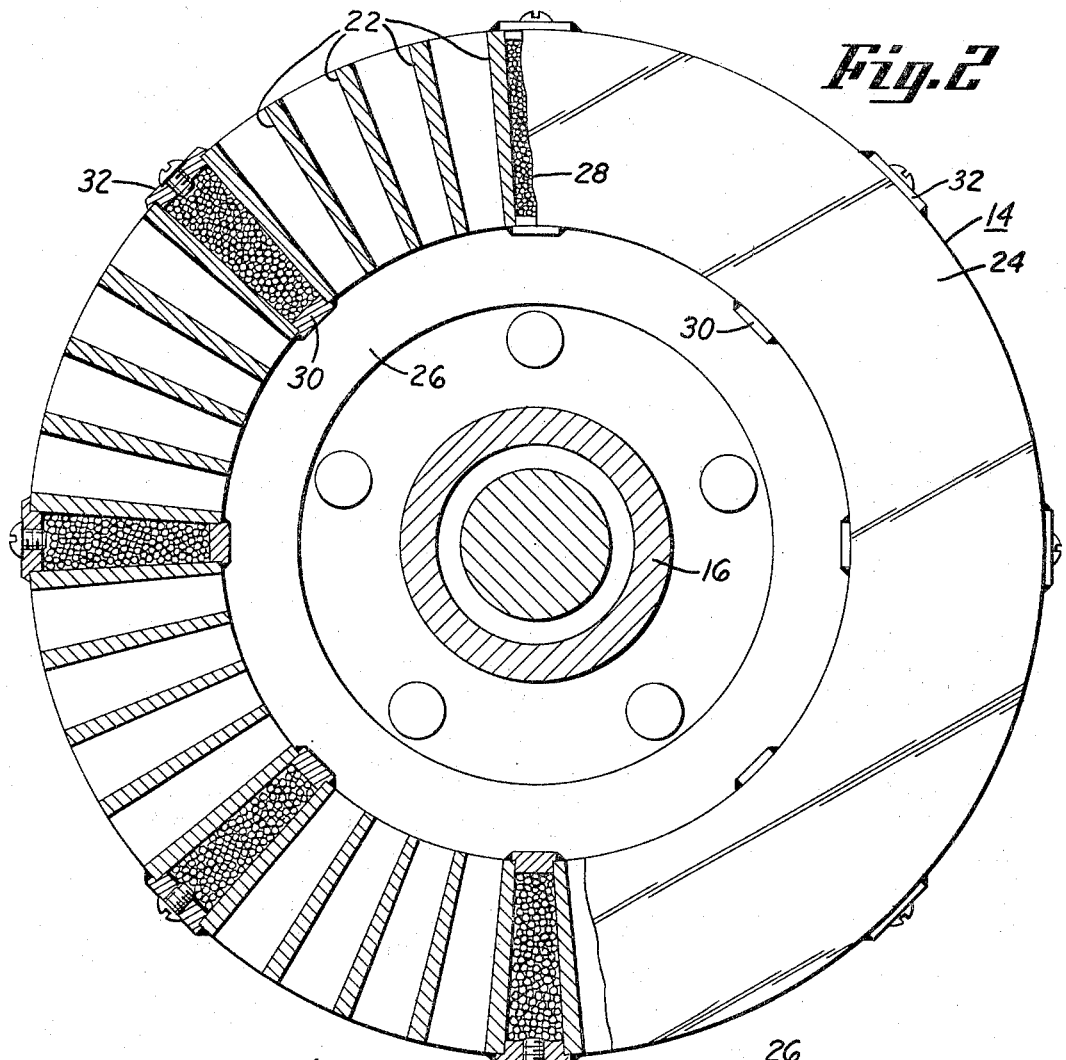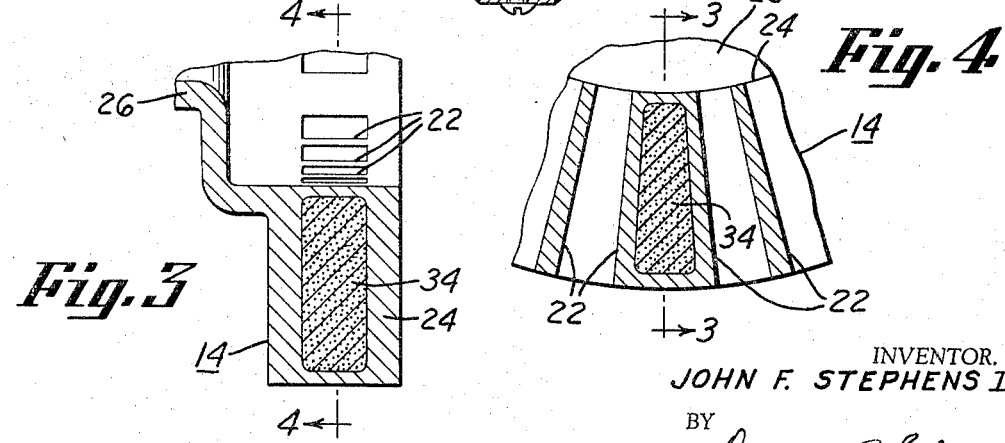

3,378,115
DISC DAMPER
John F. Stephens III, Bethesda, Md., assignor to General Motors Corporation, Detroit, Mich., a corporation of Delaware
Filed July 14, 1965, Ser. No. 471,865
4 Claims. (Cl. 188—218)

This invention relates to disc brake systems and more particularly to a dampening means for use with discs used in such a system.

Discs commonly used in caliper type disc braking systems can take a bell shape. This bell-shaped member is arranged to rotate with a vehicle wheel and can amplify sounds created during the movement of the wheel over the pavement or can amplify sounds created by vibration within the disc itself. Disc amplified sound can be offensive and it is therefore desirable to have means to dampen this sound.

It is an object of the present invention to provide improved means for dampening sound developed during operation of a vehicle equipped with disc brakes.

It is another object of the present invention to provide improved sound deadening means for disc brakes which is economical to manufacture and adaptable for use with disc brakes of common design.

It is still another object of the present invention to provide improved sound deadening means carried in the cooling vanes of a bell-shaped disc.

Further objects and advantages of the present invention will be apparent from the following description, reference being had to accompanying drawings wherein preferred embodiments of the present invention are clearly shown.

In the drawings:

FIGURE 2 is a sectional view taken along line 2—2 of FIGURE 1;

FIGURE 3 is a sectional view of another embodiment of the subject invention taken along line 3—3 of FIGURE 4;

FIGURE 4 is a sectional view taken along line 4—4 of FIGURE 3.

Figure 1:
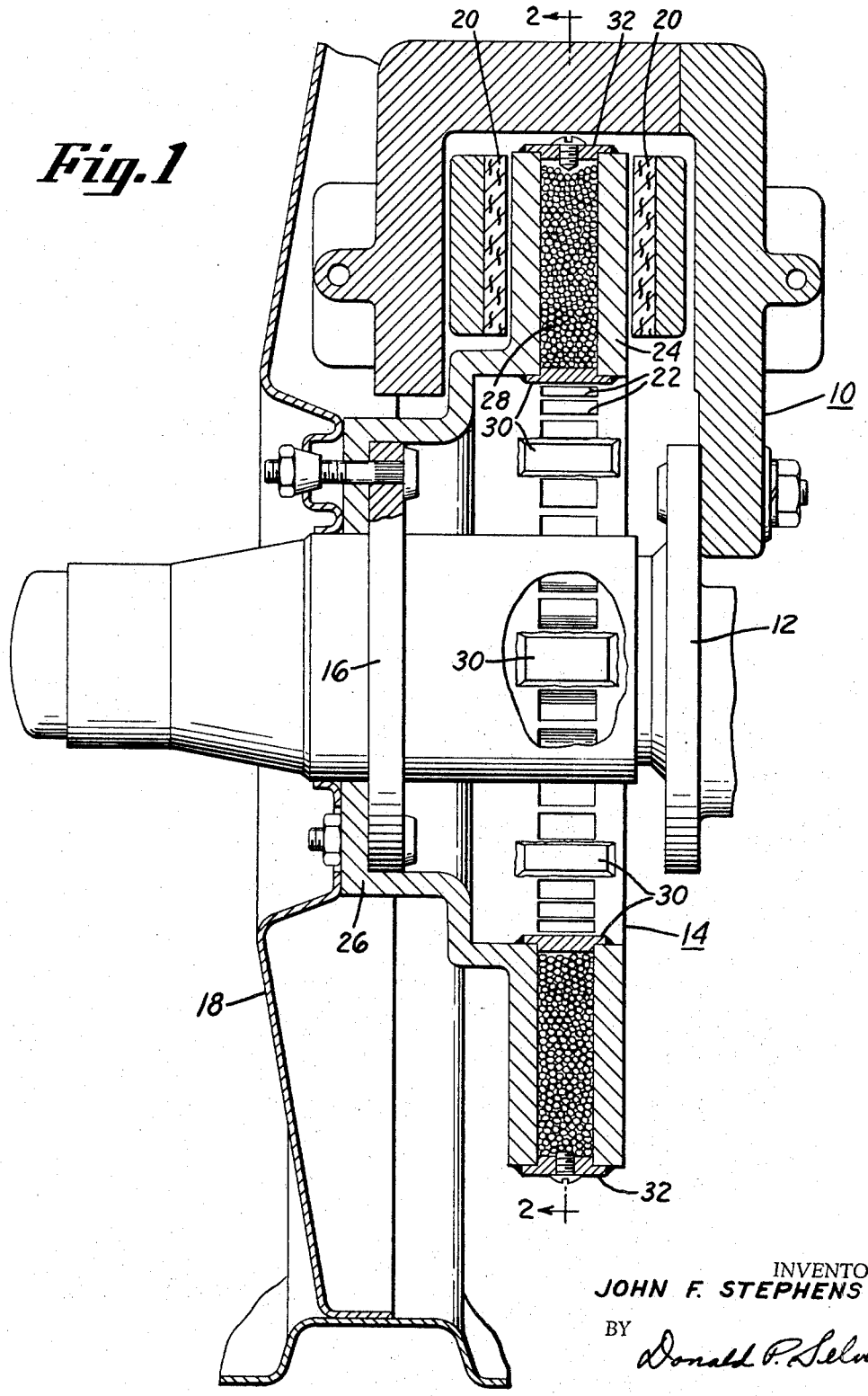
FIGURE 1 is a sectional view with a typical disc braking system with the subject invention shown in its operative environment.

Referring to FIGURE 1, a caliper portion 10 of a disc brake system is shown mounted in fixed relationship to an axial flange 12. A substantially bell-shaped disc 14 is illustrated as passing between opposed portions of the caliper in a conventional manner, said disc being carried by a hub 16 which is rotatable with respect to axial flange 12. Vehicle wheel 18 is likewise carried by a hub 16. It is then apparent that hub 16, disc 14 and wheel 18 rotate with respect to relatively fixed axial flange 12 and caliper 10. A braking action is developed by hydraulic pressure acting against friction elements 20 disposed on opposite sides of the rotatable disc 14. An examination of FIGURE 1 illustrates the substantial bell shape of the disc 14 and the attachment of the disc to the wheel 18 through which road noise is transmitted.

Cooling vanes 22 are equally spaced in a rim portion 24 of disc 14 and cooperate with the axial mounting means 26 to form the bell. Cooling vanes 22 are normally open at opposite ends thereby allowing the free passage of air therethrough and being thereby arranged to dissipate heat generated during the braking action from disc 14.

A material, such as granular material or shot 28, is carried in selected cooling vanes which are closed at opposed ends by closure members 30 and 32. Referring to FIGURE 2, this shot is seen operatively positioned in the cooling vanes 22, it being understood that selective vanes 22 are symmetrically placed around the periphery of disc 14 to eliminate vibration thereof. Vibration normally caused by disc rotation and by the road surface contact of tires is dampened by the shot disposed in the vanes 22 and eliminates a great amount of the objectionable noise common in disc brakes.

In FIGURE 3 is illustrated an embodiment of the present invention wherein cooling vanes 22 selected as in FIGURE 2 are filled with a material such as sand. This sand can be cast into the disc when originally formed and eliminates the need for closure members 30 and 32. The consistency of the sand or granular material 34 is left to the designer of the particular disc braking system so that optimum dampening is achieved in a given installation.

The utility of the subject invention is apparent in the disc braking system because any movement of the granular material or shot cannot be heard and the interstices between the grains does not permit of ready sound transmission. The dampening characteristics of shot are similar in many respects to sand but may provide a more desirable loading of the disc or may be added to a disc already formed without the sand cast therein. Therefore, the subject invention is adaptable for use in conventional discs already in use or can be incorporated into a disc while being formed. The speed of rotation and the diameter of the disc will determine in many instances the degree of filling of the selected vanes desired or the consistency of the material to be used.

While the embodiments of the present invention, as herein disclosed, constitute preferred forms, it is to be understood that other forms might be adopted.

What is claimed is as follows:

1. A disc for a disc braking system, said disc comprising: a cast member formed in a substantially circular shape, said cast member having an axial support portion and a portion peripherally engaging said support portion arranged to be frictionally engaged by friction members to provide a braking action, said cast member having elongated chambers formed in said frictionally engaged portion; cooling means including the walls of said elongated chambers integrally formed in said last mentioned portion for carrying away heat generated during a braking action; and dampening means formed in selected portions of said cooling means during casting of said cast member and arranged therein to deaden sound normally produced by said cast member during rotation and braking of said disc.

2. A disc according to claim 1 wherein said dampening means is granular material cast into selected portions of said cooling means during casting of said disc serving to dampen vibration thereof.

3. A disc according to claim 1 wherein said dampening means is shot carried in said cooling means to dampen vibration thereof.

4. A disc according to claim 1 wherein said dampening means is powdered metal carried in said cooling means to dampen vibration thereof.

References Cited

UNITED STATES PATENTS

| 1,007,418 | 10/1911 | Beecher. | |
| 2,129,178 | 9/1938 | Jordan. | |
| 2,265,340 | 12/1941 | Bond | 188—218 |
| 2,641,940 | 6/1953 | White | 188—1 X |
| 3,120,882 | 2/1964 | Maloney | 188—218 |

FOREIGN PATENTS

| 218,161 | 11/1958 | Australia. |

MILTON BUCHLER, *Primary Examiner.*

GEORGE E. A. HALVOSA, *Examiner.*